(12) United States Patent
Chaudhuri et al.

(10) Patent No.: US 8,204,866 B2
(45) Date of Patent: Jun. 19, 2012

(54) LEVERAGING CONSTRAINTS FOR DEDUPLICATION

(75) Inventors: Surajit Chaudhuri, Redmond, WA (US); Venkatesh Ganti, Redmond, WA (US); Shriraghav Kaushik, Redmond, WA (US); Anish Das Sarma, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 11/804,400

(22) Filed: May 18, 2007

(65) Prior Publication Data

US 2008/0288482 A1 Nov. 20, 2008

(51) Int. Cl.
*G06F 17/30* (2006.01)
(52) U.S. Cl. ........................ 707/692; 707/693
(58) Field of Classification Search ................ 707/204
See application file for complete search history.

(56) References Cited

U.S. PATENT DOCUMENTS

| | | | |
|---|---|---|---|
| 568,061 A | 10/1997 | Rail et al. | |
| 579,930 A | 8/1998 | Johnson et al. | |
| 652,304 A1 | 2/2003 | Morgan et al. | |
| 694,130 A1 | 9/2005 | Perrizo | |
| 696,172 A1 | 11/2005 | Chaudhuri et al. | |
| 6,965,888 B1 | 11/2005 | Cesare et al. | |
| 709,295 A1 | 8/2006 | Ruediger | |
| 2003/0182310 A1* | 9/2003 | Charnock et al. | 707/104.1 |
| 2004/0267818 A1* | 12/2004 | Hartenstine | 707/104.1 |
| 2005/0027717 A1* | 2/2005 | Koudas et al. | 707/100 |
| 2005/0210043 A1 | 9/2005 | Manasse | |
| 2005/0235260 A1* | 10/2005 | Matsutsuka et al. | 717/114 |
| 2005/0246318 A1 | 11/2005 | Giang et al. | |
| 2007/0005556 A1 | 1/2007 | Ganti et al. | |

OTHER PUBLICATIONS

Shen et al. (Constraint-Based Entity Matching, In Proceedings of American Association for Artificial Intelligence, 2005, Menlo Park, CA).*
"Association for computing machinery", http://www.acm.org.
"Dblp.", http://www.informatik.uni-trier.de/~ley/db/index.html.
"Lavastorm", Date: 2007, Making the case for automated revenue assurance solutions, http://www.lavastormtech.com.
"The K-Means Clustering Algorithm", http://mathworld.wolfram.com/K-MeansClusteringAlgorithm.html.
Ananthakrishna, et al., "Eliminating fuzzy duplicates in data warehouses", Date: Aug. 20-23, 2002, pp. 1-12, Proceedings of the 28th VLDB Conference, Hong Kong, China.
Aslam, et al., "A practical clustering algorithm for static and dynamic information organization", Date: 1999, pp. 51-60, Society for Industrial and Applied Mathematics, Philadelphia, USA.
Aslam, et al., "Static and dynamic information organization with star clusters", Date: 1998, pp. 208-217, ACM Press, NY, USA.
Bansal, et al., "Correlation clustering", Date: 2002, pp. 89-113, Department of Computer Science, Carnegie Mellon University.
Bilenko, et al., "Integrating constraints and metric learning in semi-supervised clustering", Date: 2004, p. 11, ACM Press, NY, USA.

(Continued)

*Primary Examiner* — Jean B Fleurantin
*Assistant Examiner* — Anteneh Girma

(57) ABSTRACT

A deduplication algorithm that provides improved accuracy in data deduplication by using aggregate and/or groupwise constraints. Deduplication is accomplished using only as many of these constraints that are satisfied rather than be imposed inflexibly as hard constraints. Additionally, textual similarity between tuples is leveraged to restrict the search space. The algorithm begins with a coarse initial partition of data records and continues by raising the similarity threshold until the threshold splits a given partition. This sequence of splits defines a rich space of alternatives. Over this space, an algorithm finds a partition of the input that maximizes constraint satisfaction. In the context of groupwise aggregation constraints for deduplication all SQL (structured query language) aggregates are allowed, including summation.

20 Claims, 12 Drawing Sheets

OTHER PUBLICATIONS

Bitton, et al., "Duplicate record elimination in large data files", Date: Jun. 1983, pp. 255-265, vol. 8, Issue: 2, ACM Press, NY, USA.

Bohannon, et al., "A costbased model and effective heuristic for repairing constraints by value modification", Date: 2005, pp. 143-154, ACM Press, NY, USA.

Bilenko, et al., "Adaptive Duplicate Detection Using Learnable String Similarity Measures", Date: Aug. 24-27, 2003, pp. 39-48, Proceedings of the Ninth ACM SIGKDD International Conference on Knowledge Discovery and Data Mining (KDD-2003), Washington DC.

Bitton, et al., "Duplicate record elimination in large data files", Date: Jun. 1983, pp. 255-265, vol. 8, Issue: 2, ACM Press, New York, USA.

Culotta, et al., "Learning Clusterwise Similarity with First-Order Features", pp. 1-2, Department of Computer Science, University of Massachusetts, Amherst, MA.

Chaudhuri, et al., "Robust and efficient fuzzy match for online data cleaning", Date: 2003, pp. 313-324, ACM Press, NY, USA.

Chaudhuri, et al., "Robust identification of fuzzy duplicates", Date: Apr. 5-8, 2005, pp. 865-876, Proceedings of the 21st International Conference on Data Engineering, ICDE 2005.

Chomicki, et al., "Minimal-change integrity maintenance using tuple deletions", Date: Feb. 15-25, 2005, pp. 90-121, vol. 197, Issue: 1-2, http://www.sciencedirect.com/science?_ob=ArticleURL&_udi=B6WGK-4FKYDRM-l&_user=10&_coverDate=02%2F25%2F2005&_rdoc=1&_fmt=&_orig=search&_sort=d&view=c&_acct=C000050221&_version=1&_urlVersion=0&_userid=10&md5=c403783e6f1f3b51dcefdc5c23c74365.

Davidson, et al., "Measuring constraint-set utility for partitional clustering algorithms", Date: 2006, pp. 1-12, State University of New York, Albany, NY.

Dong, et al., "Reference reconciliation in complex information spaces", Date: 2005, pp. 85-96, ACM Press, NY, USA.

Elmagarmid, et al., "Duplicate record detection: a survey", Date: Jan. 2007, vol. 19, Issue No. 1, IEEE transactions on knowledge and data engineering.

Felligi, et al., "A theory for record linkage", Date: Dec. 1969, pp. 1183-1210, vol. 64, Issue No. 328, Journal of the American Statistical Society.

Greco, et al., "A logical framework for querying and repairing inconsistent databases", Date: Dec. 2003, pp. 1389-1408, vol. 15, Issue: 6, IEEE Transactions on Knowledge and Data Engineering.

Halldorsson, et al., "Approximations of weighted independent set and hereditary subset problems", Date: 2000, pp. 1-16, vol. 4, Issue No. 1, Journal of Graph Algorithms and Applications.

Hernandez, et al., "The merge/purge problem for large databases", Date: May 1995, pp. 127-138, ACM Press, NY, USA.

Koudas, et al., "Record linkage: similarity measures and algorithms", Date: 2006, pp. 802-803, ACM Press, NY, USA.

McCallum, et al., "Efficient clustering of high-dimensional data sets with applications to reference matching", Date: 2000, pp. 169-178, ACM Press, NY, USA.

Monge, et al., "An efficient domain independent algorithm for detecting approximately duplicate database records", Date: May 1997, Department of Computer Science and Engineering, University of California, San Diego. California.

Shen, et al., "Constraint-Based Entity Matching", Date: 2005, American Association for Artificial Intelligence.

Tung, et al., "Constraint-based clustering in large databases", Date: 2001, p. 405, http://www.springerlink.com/content/qbvr04jtbp52qk7u.

* cited by examiner

╭─ 400 procedure ConstraintSatisfy
begin
   1. Begin with the initial partition $P$
   2. For each group of tuples $x \in P$
   3.     Compute *MaxFrontier(x)*
   4. Return the union of the above groups
end procedure *MaxFrontier*(group $x$ of tuples)
begin
   1. If $x$ is a singleton group
        Return a partition containing a single group $x$
   2. Let $P \leftarrow$ Split($x$)
   3. *MaxBenefit(x)* $\leftarrow$ max(*benefit(x)*,
        $\Sigma_{y \in P}$*MaxBenefit(y)*))
   4. If *benefit(x)* was larger in the previous step
   5.     *MaxFrontier(x)* contains a single group $x$
   6. Else
   7.     *MaxFrontier(x)* is the union of
        $\{MaxFrontier(y) : y \in P\}$
   8. Return *MaxFrontier(x)*
end

*FIG. 4*

⟵ 500 procedure Split(group *x* of tuples)
begin
1. Sort the edges of the similarity graph in descending order of weight
2. Maintain a collection of disjoint sets using Union-Find
   Initialize the collection so that every node is in a separate subgroup by itself
3. While (there are > 2 separate subgroups)
4.     Select an edge of highest similarity that connects two separate subgroups
5.     Merge the two subgroups together
6. If (left with two subgroups)
7.     Return these two subgroups (this means the input graph was connected)
8.     The similarity of the next edge that connects these two subgroups is the splitting threshold
9. Else
10.    Return each of the current subgroups (this means the input graph was disconnected)
end

*FIG. 5*

LEVERAGING CONSTRAINTS FOR DEDUPLICATION

BACKGROUND

When information from multiple sources of data is integrated, the data invariably leads to erroneous duplication of the data when these sources store overlapping information. For example, two organizations can store information about publications, authors and conferences. Owing to data entry errors, varying conventions and a variety of other reasons, the same data may be represented in multiple ways, for example, an author's name may appear as "Edsger Dijkstra" or "E. W. Dijkstra". A similar phenomenon occurs in enterprise data warehouses that integrate data from different departments such as sales and billing that sometimes store overlapping information about customers.

Such duplicated information can cause significant problems for the users of the data. For instance, errors in data lead to losses in revenue by failing to charge customers for services provided motivating the need for revenue recovery applications that reconcile the billing and services databases in an enterprise by integrating the databases to ensure that every service is billed. Duplicated data can also lead to increased direct mailing costs because several customers may be sent multiple catalogs, or produce incorrect results for analytic queries leading to erroneous data mining models. Hence, a significant amount of time and money is spent on the task of detecting and eliminating duplicates.

This problem of detecting and eliminating multiple distinct records representing the same real world entity is traditionally called the deduplication problem. The problem is challenging since the same record may be represented in different ways, thus rendering simple duplicate elimination by using "select distinct" queries inadequate.

Conventional methods exploit the textual similarity between the records where textual similarity is measured using a similarity function that for every pair of records, returns a number between zero and one, a higher value indicating a better match, with one corresponding to equality. The task of deduplication is to translate this pairwise information into a partition of the input relation.

While duplication in the real world is an equivalence relationship, the relationship induced by the similarity function is not necessarily an equivalence relation; for example, it may not be transitive. Conventional work has therefore proceeded by modeling the individual records as nodes, the pairwise matches as edges in a graph, and using a graph partitioning algorithm to find sets of records to be collapsed. However, these methods are inefficient and time consuming.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A deduplication algorithm is disclosed that provides improved accuracy in data deduplication by using constraints. The deduplication algorithm not only leverages a class of aggregate constraints but can also be applied to groupwise constraints when integrating multiple sources of data. Groupwise constraints are required to be satisfied by each group in the output of deduplication.

While constraints for data deduplication are expected to hold in a clean database, errors in the data lead to violations of these constraints. These violations can be leveraged as an additional source of information (other than textual similarity) during deduplication. Thus, if collapsing two records that are textually similar leads to a violated constraint getting satisfied, this can be used as additional evidence of these records being the same.

The disclosed techniques also address approximate satisfaction. In other words, it is only a requirement that as many of these constraints is satisfied as possible rather than be imposed inflexibly as hard constraints. Additionally, textual similarity between tuples is leveraged to restrict the search space.

The algorithm begins with a coarse initial partition of data records and continues by raising the similarity threshold until the threshold splits a given partition. This sequence of splits defines a rich space of alternatives. Over this space, an algorithm finds a partition of the input that maximizes constraint satisfaction.

In the context of groupwise aggregation constraints for deduplication all SQL (structured query language) aggregates are allowed, including summation. Further, a maximum satisfaction version of the problem is provided. With respect to constraint repair, the idea is to perform the least number of operations including tuple insertions, deletions and value modifications so that the resulting database instance satisfies a given set of constraints. The disclosed methods are applicable in the context of extending the repair approach to handle aggregate constraints.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 4 illustrates an algorithm for an arbitrary benefit function.

FIG. 5 illustrates a procedure that is used to split a group.

DETAILED DESCRIPTION

Figure 1:
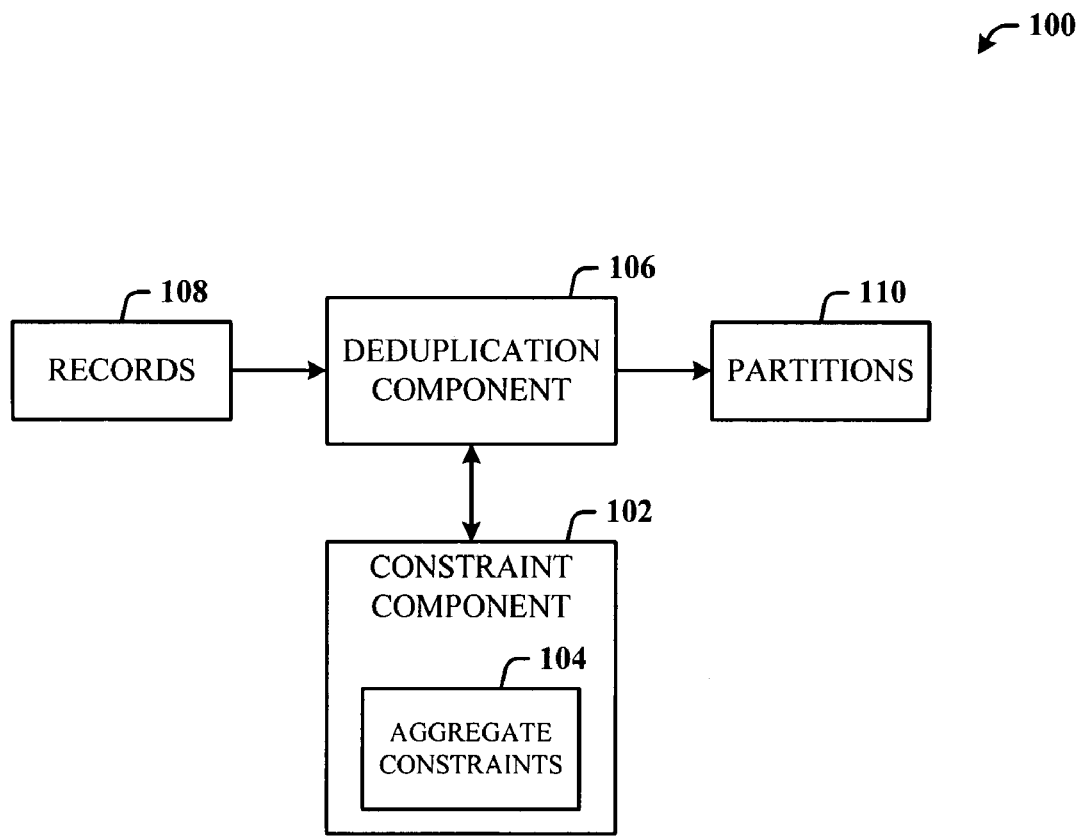
FIG. 1 illustrates a computer-implemented system for data deduplication.

The disclosed architecture includes deduplication algorithm that provides improved accuracy in data deduplication by using constraints (e.g., aggregate, groupwise). The deduplication algorithm not only leverages a class of aggregate constraints but can also be applied to groupwise constraints when integrating multiple sources of data. Groupwise constraints are required to be satisfied by each group in the output of deduplication. Errors in the data lead to violations of these constraints and these violations can be leveraged as an additional source of information during deduplication. Thus, if collapsing two records that are textually similar leads to a violated constraint getting satisfied, this can be used as additional evidence of these records being the same.

The output partition space is restricted using textual similarity to provide a space of valid groups based on a best effort to satisfy as many constraints as possible rather apply the constraints as hard constraints. In other words, an algorithm finds a partition of the input that maximizes constraint satisfaction over the space of valid groups.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 for data deduplication. The system 100 includes a constraint component 102 for providing a class of aggregate constraints 104 for data processing. It is to be understood that the class can also include groupwise constraints. A deduplication component 106 is provided for receiving an input relation of data records 108 and outputting a space of partitions 110 of the records 108 based on the class of aggregate constraints 104.

The class of aggregate constraints 104 can be based on a structured query language (SQL) aggregate function where the SQL aggregate function employs a comparison operator that is one of less than (<), less than or equal ($\leq$), equal (=), greater than (>), or greater than or equal to ($\geq$), for example.

Figure 2:
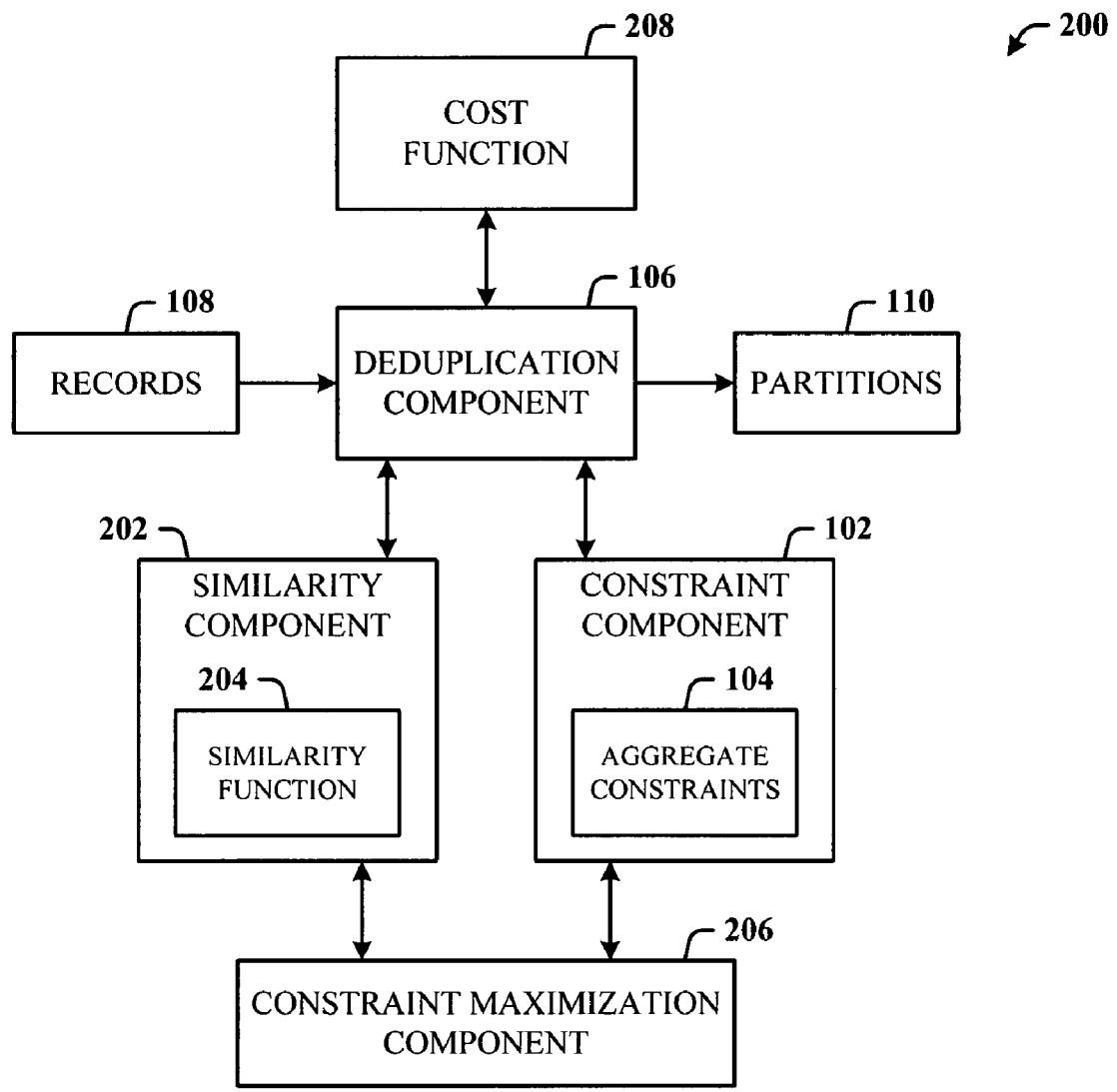
FIG. 2 illustrates an alternative embodiment of a system for data deduplication.

FIG. 2 illustrates an alternative embodiment of a system 200 for data deduplication. The system 200 includes the constraint component 102 for providing the class of aggregate constraints 104 for data processing and the deduplication component 106 for outputting the space of partitions 110 of the records 108 based on the class of aggregate constraints 104. Additionally, the system 200 includes a similarity component 202 for processing a similarity function 204 on the records 108 that provides a measure (or metric) of textual similarity between the records 108 for restricting the space of partitions 110. The space of partitions 110 can be constructed by thresholding a similarity graph incrementally.

The system 200 can also include a constraint maximization component 206 for maximizing satisfaction of a constraint over tuples. The maximization component 206 maximizes a number of groups of the tuples that satisfy the constraint. Additionally, the maximization component 206 maximizes a number of the tuples that are members of groups that satisfy the constraint. The system 200 can also include a cost function 208 for determining a cost associated with finding an optimal partition.

Following is a more detailed description of systems and methods for data deduplication. Aggregate constraints (as opposed to pairwise constraints) that often arise when integrating multiple sources of data can be leveraged effectively for deduplication. However, despite its appeal, the problem is computationally difficult. Therefore, a restricted search space is defined for deduplication that is intuitive in this context and the problem is solved optimally for the restricted space. Incorporating aggregate constraints significantly enhances the accuracy of deduplication.

The disclosed architecture exploits at least aggregate constraints for deduplication. Although described in the context of aggregate constraints, it is to be understood that more broadly that the disclosed systems and methods also apply to groupwise constraints. The aggregate constraints can be illustrated through the following example.

Knowledge Partners Inc., which provides business rule services, submits examples of these rules on its web site. The setting is that there is a Parks company that manages several parks and individuals can enroll as members in several of these parks. An example constraint here is that the total monthly fee for each member is calculated by adding up the monthly fees for each park in which the member is enrolled. In the revenue recovery application, for every customer entity, the amount sold according to a Sales database must equal the amount billed according to a Billing database.

Consider another example of integrating information about publications from sources ACM and DBLP. Assume that each source contains all type JACM papers published thus far. Then, for every author entity in the resulting database, the number of JACM papers authored as measured using sources ACM and DBLP must be the same.

While these constraints are expected to hold in a clean database, errors in the data lead to violations of these constraints. The violations can be leveraged as an additional source of information (other than textual similarity) during deduplication. Thus, if collapsing two records that are textually similar leads to a violated constraint getting satisfied, this is additional evidence of these records being the same. Consider the following example.

EXAMPLE 1

With respect to the Parks database as mentioned in the example above, each park maintains a separate registration database, while there is also a central Billing repository containing information about all members and the total amount billed. Interest is in deduplicating the member entities. Assume that the member name is a key. A subset of the member names includes two numeric columns. One of these numeric columns, called Fees Stored is the total fees for the member as stored in the Billing database, while the other, Fees Derived represents the total fee as computed by aggregating the data across the parks. Assume that when collapsing the two records during deduplication, the total fees are added. The following tables show two members "John Doe" and "J. Doe". These strings may or may not refer to the same person.

Scenario 1.

| Member | Fees Stored | Fees Derived |
|---|---|---|
| John Doe | 100 | 130 |
| J. Doe | 40 | 10 |
| ... | ... | ... |

Scenario 2.

| Member | Fees Stored | Fees Derived |
|--------|-------------|--------------|
| John Doe | 100 | 100 |
| J. Doe | 40 | 10 |
| ... | ... | ... |

In Scenario 1, there is a mismatch between the Fees Stored and Fees Derived amounts, and collapsing the two records fixes this mismatch. In Scenario 2, there is no mismatch between the Fees Stored and Fees Derived amounts for the string "John Doe" and collapsing the record with "J. Doe" creates a mismatch. This information can be used to conclude that in Scenario 1, the two records should be collapsed, whereas in Scenario 2, the records should not be collapsed. Note that a traditional deduplication algorithm bases the decision of whether to collapse the two records or not independent of the constraint.

It is likely that in the presence of dirty data it would be difficult to satisfy these constraints exactly. The above example is used as an illustration. Accordingly, the disclosed methods also address approximate satisfaction.

The following description begins by formalizing a class of aggregate constraints and illustrates various examples that can be captured using the formalism. The formulation is developed by first considering an--approach to addressing these constraints without necessarily utilizing textual similarity between the tuples. Ultimately, aggregate constraints are used as an additional source of information other than the textual similarity between the tuples.

The disclosed methods operate in that as many of these constraints are satisfied as possible rather than imposing inflexibility as hard constraints. Second, the textual similarity between tuples is leveraged to restrict the search space.

The process begins with a coarse initial partition of the data and incrementally raises the similarity threshold until the data splits a given partition. This sequence of splits defines a rich space of alternatives. Over this space, an algorithm is provided that finds the partition of the input which maximizes constraint satisfaction. It can be shown empirically that leveraging aggregation constraints substantially improves the accuracy of deduplication. Moreover, the algorithm scales well with data size.

In the context of groupwise aggregation constraints for deduplication, all SQL (structured query language) aggregates can be allowed, including summation. Further, since imposing these constraints as hard constraints leads to intractability, a maximum satisfaction version of the problem can be formulated.

Following is a description of a class of constraints and how the constraints can be incorporated deduplication. The input to the deduplication problem is a relation (or view) R(T, $N_1, \ldots, N_k$) with a text field T and numeric fields $N_i$. The output is a partition of the records in R which are captured through a GroupID column that is added as a result of deduplication. Each equivalence class in the partition can be referred to as a group of tuples. Scenario 3 shows a snippet of the Members relation described in Scenario 1 and two possible partitions, shown using the values in columns GroupID1 and GroupID2.

Scenario 3.

| Member | Fees Stored | Fees Derived | GroupID1 |
|--------|-------------|--------------|----------|
| John Doe | 100 | 130 | 1 |
| J. Doe | 40 | 10 | 1 |
| Alice Jones | 40 | 60 | 2 |
| A. Jones | 20 | 10 | 2 |
| Jones | 20 | 10 | 2 |

Scenario 4.

| Member | Fees Stored | Fees Derived | GroupID2 |
|--------|-------------|--------------|----------|
| John Doe | 100 | 130 | 1 |
| J. Doe | 40 | 10 | 1 |
| Alice Jones | 40 | 60 | 2 |
| A. Jones | 20 | 10 | 2 |
| Jones | 20 | 10 | 3 |

Defining a class of constraints, recall the constraint described in Example 1. Consider a group of tuples that is collapsed together as part of deduplication. It is desired that this group of tuples satisfy a constraint that the total fees stored, obtained by summing the Fees Stored column over the tuples in the group, equal the total fees computed, obtained by summing the Fees Computed column. This illustrates the constraint language.

The following formally defines this class of aggregate constraints. For a tuple $t \in R$, write $t[A]$ to denote the value of t in column N. Let $S = \{t_1, \ldots, t_n\} \subseteq R$ be a subset of tuples from R. Let Agg be a SQL aggregation function. For column N, write $Agg(S[N])$ to denote the value obtained by aggregating $t[N]$ using function Agg over all tuples in $t \in S$. The subset S satisfies a predicate $Agg_1(N_i) \theta Agg_2(N_j)$ if $Agg_1(S[N_i]) \theta Agg_2(S[N_j])$.

DEFINITION 1. Consider relation $R(T, N_i, \ldots, N_k)$ as described above. An aggregate constraint is a conjunction of atomic predicates of the form $Agg_1(N_i) \theta Agg_2(N_j)$. Here, $Agg_i$ is a standard SQL aggregation function and $\theta$ is a comparison operator drawn from $\{<, \leq, =, \geq, >\}$.

S satisfies an aggregate constraint if each atomic predicate is satisfied. A partition of R is said to satisfy a predicate (constraint) if every group in the partition satisfies the predicate (constraint). Such a partition, if it exists, is said to be a repair of R. Following is an example that illustrates these definitions.

EXAMPLE 2

Consider the Members relation and the partitions shown in Scenario 3 and Scenario 4 with the constraint sum(Fees Stored)=sum(Fees Derived). Each group in the partition defined by column GroupID1 satisfies the constraint. Hence, the partition defined by GroupID1 satisfies the constraint. On the other hand, the partition defined by GroupID2 does not satisfy the constraint, since the groups corresponding to GroupID2=2, 3 do not satisfy the constraint.

As stated above, a goal is to leverage aggregate constraints in the problem of deduplication. The precise formulation for incorporating constraints in addition to textual similarities is discussed infra. Following are illustrations of additional examples of how aggregate constraints can be relevant for deduplication.

EXAMPLE 3

Continuing with the revenue recovery setting referred to above, a Shipping database and a Billing database each with a Customer(name) relation and an Orders(custname,totalprice) relation. In the Billing database, the Orders relation corresponds to all orders billed, whereas in the Shipping database, the Orders relation corresponds to orders shipped. Now assume that these databases are integrated into a warehouse that tracks all information pertaining to customers. A single CustomerCombined relation can be obtained by taking the union of the customer relations in both databases. Wishing to deduplicate the customer entities based on textual similarities in names, the constraint for each customer can be exploited, in that the total amount billed must equal the total amount shipped through the following views.

```
--Compute the amount billed per customer
create view AmtBilled(name, value) as
    (select C.name, sum(coalesce(O.totalprice,0))
    from CustomerCombined C left outer join
        Billing..Orders O
        on C.name = O.custname
    group by C.name)
--Compute the amount shipped per customer
create view AmtShipped(name, value) as
    (select C.name, sum(coalesce(O.totalprice,0))
    from Customer C left outer join
        Shipping..Orders O
        on C.name = O.custname
    group by C.name)
--Join the amount shipped and billed per customer
create view CustomersAll(name,valuebilled, valueshipped) as
    (select B.name, B.value, S. value
    from AmtBilled B, AmtShipped S
    where B.name = S.name)
```

The coalesce function used above can be provided by SQL and converts null values to a specified value. Thus, the above use of the coalesce function ensures that if a customer value is not present in either database, then the totalprice column is aggregated as 0. In order to express the aggregate constraint, focus is on deduplicating customers in the CustomersAll view (which has exactly the same names as CustomersCombined). The aggregate constraint that is expected to hold in the output of the deduplication is sum(valuebilled)=sum(valueshipped). This constraint can be relaxed to sum(valuebilled)>=sum (valueshipped) and sum(valueshipped)>=0.95*sum(valuebilled), for example, expressing the fact that all shipped orders must be billed, and that most (as opposed to all) orders that are billed must be shipped. Alternatively, it can be seen that the constraint can also express that all orders billed before a certain date must be shipped.

Now consider the publication example described above.

EXAMPLE 4

Beginning with the two databases ACM and DBLP, each database has the relations Author(name) that stores information about individual authors and AuthorPaper(name, title, conference, year) that has information relating authors to papers written by the authors along with data about the papers. In this example, it is assumed that the author name is a key. Now consider the task of integrating these sources of publication data. The total set of authors, AuthorsCombined, is obtained by taking the union of the Authors relations from the two databases. Consider the following views.

```
--Compute the paper count from DBLP
create view DBLPCount(name, cnt) as
    (select A.name, count(AP.title)
    from AuthorsCombined A left outer join
        DBLP..AuthorPaper AP
        on A.name = AP.name
    where AP.journal = 'JACM'
    group by A.name)
--Compute the paper count from ACM
create view ACMCount(name, cnt) as
    (select A.name, count(AP.title)
    from AuthorsCombined A left outer join
        ACM..AuthorPaper AP
        on A.name = AP.name
    where AP.journal = 'JACM'
    group by A.name)
--Join the ACM and DBLP counts
create view AuthorsAll(name, acmcnt, dblpcnt) as
    (select A.name, A.cnt, D.cnt
    from ACMCount A, DBLPCount D
    where A.name = D.name)
```

Here, when writing ACM . . . AuthorPaper, reference is to the AuthorPaper relation in the ACM database. Note also that according to SQL, the aggregate count(AP.title) yields the value 0 when an author tuple is not present in a paper relation. Thus, the views above count the number of papers authored by each author from the two paper relations. In order to exploit aggregate constraints, focus is on the view AuthorsAll. The output of the deduplication is expected to satisfy the aggregate constraint sum(dblpcnt)=sum(acmcnt) if the JACM papers are correctly represented in both the sources. Again, note that the constraint language allows the expression of more relaxed constraints than exact equality as shown here.

Recall that a goal is to use constraints in addition to textual similarity during deduplication. First consider a hard constraint approach where given the input relation $R(T, N_1, \ldots, N_k)$ that is being deduplicated and an aggregate constraint, find a partition of R such that the output is a repair, in other words, every group satisfies the constraint.

For example, consider the problem of deduplicating the Members relation described in Example 1. A partition that satisfies the constraint sum(Fees Stored)=sum(Fees Derived) exists if and only if the total fees stored equals the total fees derived, when summed across all members. In the presence of dirty data, this condition need not necessarily hold. Thus, the hard constraint approach can be too rigid semantically.

LEMMA 1. Consider relation $R(T,N_1,N_2)$. Partition this relation using the constraint $sum(N_1)=max(N_2)$. Then check whether a repair exists is NP-complete (in the data size).

It can be seen that the hard constraint approach is limiting even computationally.

Following is a formulation of variants that attempts to maximize the constraint satisfaction. A benefit function is considered that maps a group of tuples in input relation R to a non-negative real number. Given a partition of R, a benefit is associated with the partition by computing the benefit of each individual group and summing the benefit across all partitions. A partition of R is sought that has a maximum benefit.

In a first variant called MAXPART, the benefit of an individual group is one if it satisfies the constraint, and zero, otherwise. This formulation requires that the number of groups that satisfy the constraint be maximized. Following is an example that illustrates this.

EXAMPLE 5

Consider the relation above and the constraint sum(Fees Stored)=sum(Fees Derived). According to the MAXPART benefit function defined above, the benefit of the partition defined by GroupID1 is 2, since both the individual groups satisfy the constraint, whereas the benefit of the partition defined by GroupID2 is 1, since only the group corresponding to GroupID2=1 satisfies the constraint.

In a second variant, called MAXTUP, the benefit of an individual group is its cardinality if it satisfies the constraint, and 0, otherwise. Here, it is desired that the number of tuples that are members of groups that satisfy the constraint be maximized. Again, following is an example that illustrates this.

EXAMPLE 6

Consider the relation shown in Scenario 3. According to the MAXTUP benefit function defined above, the benefit of the partition defined by GroupID1 is 5, since every tuple belongs to a group that satisfies the constraint, whereas the benefit of the partition defined by GroupID2 is 2.

While both of these formulations seek some form of constraint maximization, the formulations are not equivalent formulations. The techniques disclosed herein apply to both formulations and indeed, generalize to arbitrary benefit functions.

Following is a description for integrating maximum constraint satisfaction with textual similarity to perform deduplication. Textual similarity is used to restrict the class of groups that can belong to the output partition.

Textual similarity can be captured by using a similarity function over the tuples of relation R. A similarity function sim is used to indicate whether two tuples in R match. This function takes a pair of records and returns a number between 0 and 1. A value of 1 indicates exact equality and higher values indicate higher similarity. Examples of similarity functions are edit distance, Jaccard similarity, and more recently introduced similarity functions such as fuzzy match similarity.

The similarity function induces a weighted graph on a tuple-set, where every tuple is a node and the weight of the edge connecting two tuples is the similarity. This is referred to as a similarity graph. When the context is clear, a "group" is intended to mean the similarity graph induced over the group. For example, "a group is connected" is intended to mean that the induced similarity graph is connected.

The process of deleting all edges from a similarity graph of weight less than $\alpha$, $0 \leq \alpha \leq 1$ is referred to as thresholding the graph. A goal is to merge tuples only when similarity is high.

With respect to restricting the space of groups, it is first shown that not choosing the restricted space of groups carefully can lead to computational intractability. For example, restrict the space of groups to only include groups where the thresholded similarity graph (for a suitably high threshold values) is connected. While this restricts the space of possible groups substantially, the number of groups whose similarity graph is connected can still be exponential in the data size. In the worst case, every subset of the data is connected. Here, constraint satisfaction is maximized over the space of all partitions.

Since the constraint language allows aggregation constraints, there is a clear relationship between a problem and the well-known NP-complete problem SubsetSum, where the idea is to find whether there is a subset of a given set that has a total value equal to a given value. This corresponds to asking whether there is a group that satisfies an aggregate constraint. Based on this observation, the following result can be shown.

LEMMA 2. Consider a given relation $R(T,N_1,N_2)$ and the aggregate constraint $sum(N_1)=max(N_2)$. Determining whether there is a partition of R where at least one group satisfies the constraint is NP-complete (in the data size).

Since it is NP-hard to check whether one group that satisfies the constraint can be returned, it follows that computing an approximation of a factor for the MAXPART or MAXTUP problems is computationally intractable in the data size (unless NP=P). Thus, the space of partitions is restricted by exploiting the textual similarity between tuples, and solves the constraint maximization over this restricted space.

The space is restricted as follows. The algorithm begins with a coarse initial partition of the tuples in R which assumed to be the one consisting of all tuples collapsed into one group. The individual groups are then split by examining the similarity graph induced over the tuples in the group, and drop low weight edges until the graph gets disconnected. The new connected components define the split of the original group. Iteration is performed in this manner with each of the split groups until singleton groups are left.

The space of valid groups is defined as follows. Given a group of tuples, the splitting threshold is the lowest value of similarity $\alpha$ such that thresholding the similarity graph (induced over the group) at $\alpha$ disconnects the graph. The split of a group of tuples is the resulting set of connected components. The following procedure is only used to define the space of valid groups.

Valid Groups

1. Initialize the set of valid groups with the groups in a given partition.

2. For each group, add the split of the group to the set of valid groups.

3. Iterate until no more new groups can be added.

Figure 3:
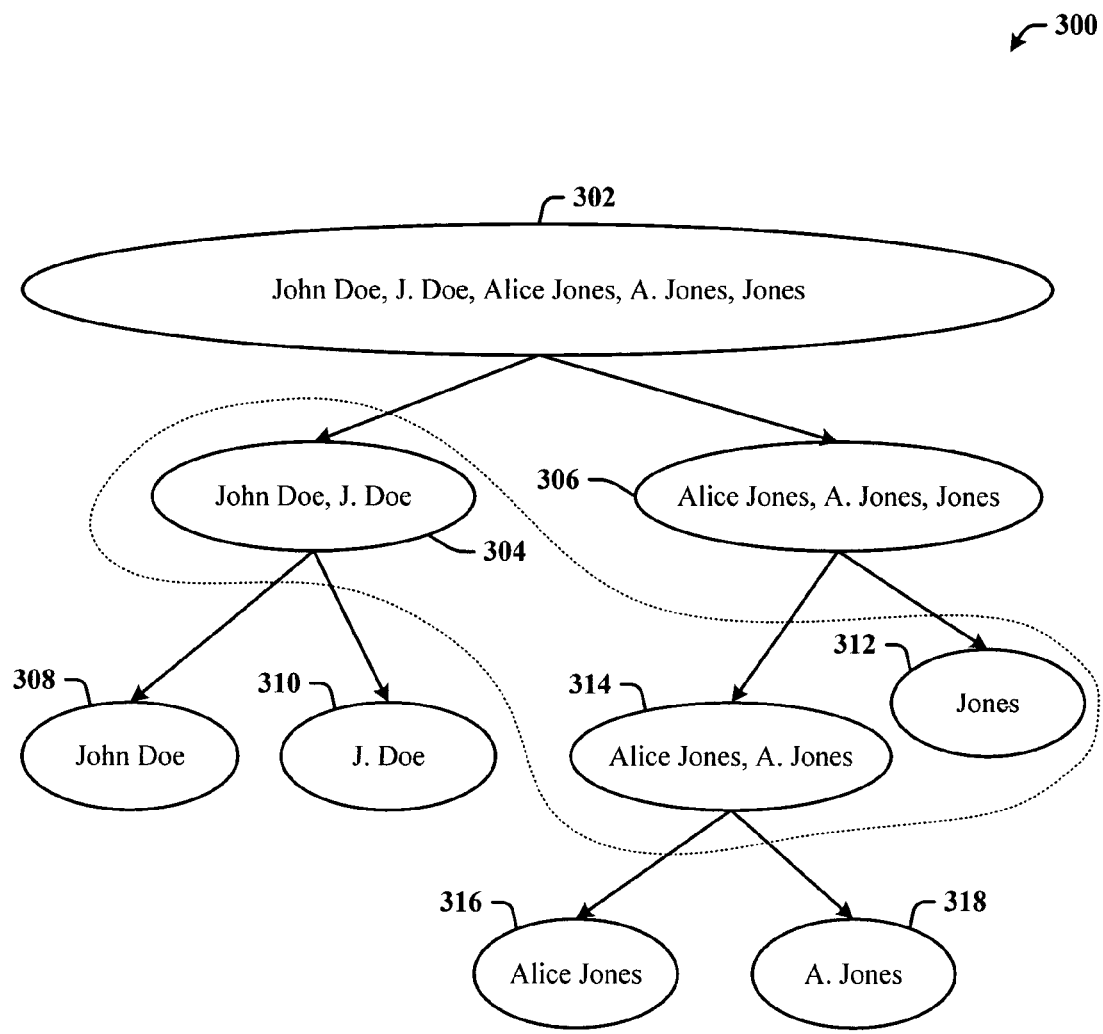
FIG. 3 illustrates a search space of valid groups.

This above procedure is illustrated using the example relation shown in Scenarios 3 and 4 above. FIG. 3 illustrates a search space 300 of valid groups.

EXAMPLE 7

Recall that for the similarity graph for the tuples in this relation, edges are not shown that carry weight 0.1 or less. The process begins with all tuples collapsed into one group at a root 302. By increasing the edge weight threshold in the search space 300, and dropping all edges whose weight is less than or equal to 0.1, the search space 300 gets disconnected into two components: a first component 304, C1, containing the strings "John Doe" and "J. Doe", and a second component 306, C2, containing the remaining strings. The first component 304 containing "John Doe" and "J. Doe" further splits at threshold 0.8 to yield the singleton groups "John Doe" 308 and "J. Doe" 310. The second component C2 306 first splits at a similarity threshold 0.7 where a singleton 312 containing "Jones" gets removed from the group 306, and a doubleton 314 is left. Finally, increasing the threshold, at threshold 0.8, the doubleton 314 further splits into the singleton groups containing "Alice Jones" 316 and "A. Jones" 318. Note that the "splitting" threshold is determined for each group locally. Thus, even though first component C1 304 breaks at threshold 0.8, this is not the threshold applied to the second component C2 306.

Consider a graph where every valid group is a node and an edge goes from one node u to another v if the group corresponding to v is obtained by splitting u. This graph is acyclic, since the node corresponding to a group can only point to another that corresponds to its subset. For the case where the initial partition is a single group consisting of all tuples, the graph is a tree where the root corresponds to the group that collapses all tuples together (in general, it is a forest). FIG. 3 shows the tree corresponding to the data in Example 7.

The search space of partitions consists of all frontiers on this split graph. Here, a frontier $\Phi$ is a set of nodes such that every root-leaf path contains exactly one node in $\Phi$. FIG. 3 shows a frontier consisting of the groups {"John Doe", "J. Doe"} (or the first component 304), the doubleton 314 {"Alice Jones", "A. Jones"}, and the singleton 312 {"Jones"}. Observe that any partition consisting of valid groups is a frontier, and that conversely, every frontier constitutes a partition.

The goal of deduplication is defined as follows, given a single aggregate constraint. Among all partitions consisting of valid groups, find-the one partition that maximizes a benefit function MAXPART; that is, find the partition where the number of groups satisfying the aggregate constraint is maximized.

While this is defined for the MAXPART function, it can be defined analogously for the MAXTUP version as well.

This specific space of valid groups is adopted by showing that the search space generalizes two previously proposed techniques for deduplication, namely single-linkage and the compact set framework. The single-linkage approach is based on the connected components obtained when the similarity graph is thresholded over the whole relation. For various values of the threshold, different partitions of the data are obtained. The space of groups obtained in this manner is referred to as singly-linked groups. A compact set is a set of tuples that are mutual nearest neighbors.

LEMMA 3. Any singly-linked group and compact set is a valid group in the search space.

Proof. Since a compact set is also a singly-linked group, it suffices to show this result for singly-linked groups. Fix a singly-linked group obtained as a connected component when thresholding the similarity graph at value a. Consider the nodes (in the above tree of valid groups) that represent the singletons containing the tuples in this group. Let their least common ancestor be node u. If u represents a strict superset of the group, then it must split at a threshold $\leq \alpha$. But this would not split the tuples in the group, contradicting the fact that u is the least common ancestor. Thus, u represents the group exactly.

Thus, the space is a generalization of two previously proposed deduplication algorithms. Further, the search space is related to the paradigm of hierarchical clustering. This can be viewed as a strength of the disclosed technique.

Moreover, the space is intuitive: it includes as extreme solutions, the case where each record is in a separate group and the single-group partition consisting of all tuples collapsed into one, and a rich space of partitions in the middle. Reasoning can be in terms of coarser and finer groups, and therefore, be aggressive and collapse many tuples or conservative and collapse only a few tuples in order to maximize the constraint satisfaction. Indeed, this intuition does enable solving of the MAXPART problem optimally.

For the restricted space of valid groups that is the focus, the MAXPART problem can be solved optimally. Indeed, the problem can be solved optimally for any benefit function that is associated with the groups. FIG. 4 illustrates an algorithm 400 for an arbitrary benefit function. The algorithm is as follows:

```
procedure ConstraintSatisfy
begin
    1. Begin with the initial partition P
    2. For each group of tuples x ∈ P
    3.     Compute MaxFrontier(x)
    4. Return the union of the above groups
end
procedure MaxFrontier(group x of tuples)
begin
    1. If x is a singleton group
           Return a partition containing a single group x
    2. Let P ← Split(x)
    3. MaxBenefit(x) ← max(benefit(x),
                Σ_{y∈P} MaxBenefit(y))
    4. If benefit(x) was larger in the previous step
    5.     MaxFrontier(x) contains a single group x
    6. Else
    7.     MaxFrontier(x) is the union of
               {MaxFrontier(y) : y ∈ P}
    8. Return MaxFrontier(x)
end
```

Recall that the benefit of a partition is the sum of the benefits of the individual groups. A goal is to find a partition with the maximum benefit. The algorithm is recursive and computes the frontier that yields the maximum benefit for each group x of tuples using procedure MaxFrontier(x). MaxFrontier(x) is computed by checking whether it is beneficial to split the group (see lines 3 through 7). The optimal frontier is then returned. The procedure ConstraintSatisfy calls MaxFrontier(x) for each group in the initial partition.

FIG. 5 illustrates a procedure 500 (denoted Split) that is used to split a group. The description not only includes determining the splitting threshold, but also using the threshold it to split a group in time O(E lg V), where $\epsilon$ is the number of edges in the similarity graph and V is the number of nodes (the number of tuples in the group). Using Minimum Spanning Tree (MST) algorithms, disjoint subgroups (representing connected sub-components in the similarity graph) are maintained using the conventional Union-Find algorithm. Initially, each node in the similarity graph is in a separate subgroup. The edges are processed in decreasing order of weight (as opposed to MST algorithms where the edges are processed in increasing order of weight), and two subgroups merge whenever an edge connects the two subgroups. If the group is connected, eventually all subgroups must merge to yield the original group.

It can be shown that if the group is connected to begin with, then the weight of the edge that takes the number of subgroups from two to one is the splitting threshold. A partition is returned that contains these two subgroups as the split of the group. Procedure Split in FIG. 5 shows the algorithm, and it is reproduced here.

```
procedure Split(group x of tuples)
begin
    1. Sort the edges of the similarity graph in descending order of weight
    2. Maintain a collection of disjoint sets using Union-Find
           Initialize the collection so that every node is in a
           separate subgroup by itself
    3. While (there are > 2 separate subgroups)
    4.     Select an edge of highest similarity that connects two
           separate subgroups
    5.     Merge the two subgroups together
    6. If (left with two subgroups)
    7.     Return these two subgroups (this means the input graph was
           connected)
    8.     The similarity of the next edge that connects these two
           subgroups is the splitting threshold
    9. Else
    10.    Return each of the current subgroups (this means the
           input graph was disconnected)
end
```

Note that if the input similarity graph is connected, the algorithm always returns a split of two subgroups. This can happen even when the edge weights are identical, even though the definition of splitting threshold requires that if an edge of a given weight is dropped, so must all other edges of the same weight. However, this only enriches the set of valid groups. Eventually, all connected subgroups will be hit as required by the splitting threshold.

Figure 6:
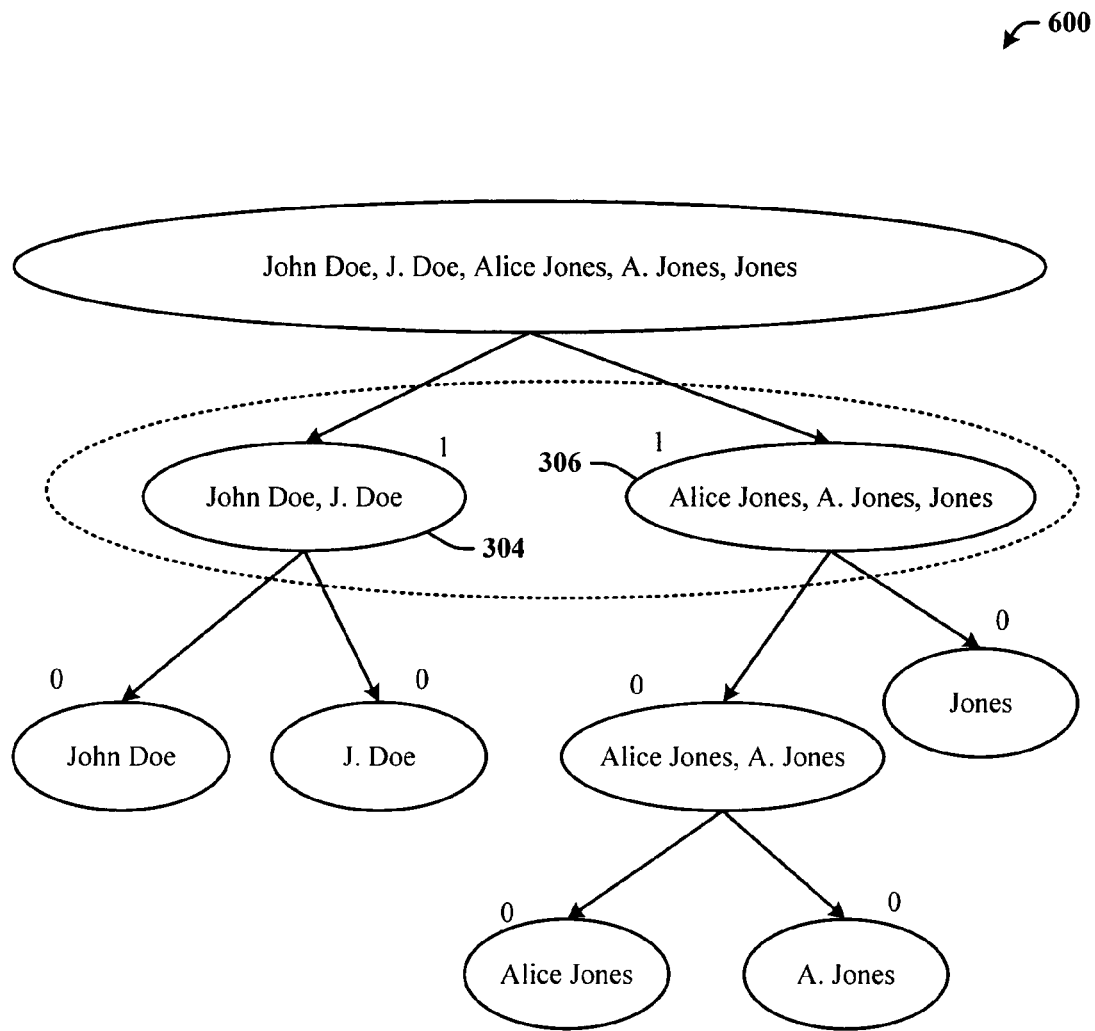
FIG. 6 illustrates a graph of how the algorithm proceeds for the space of groups shown in FIG. 3.

FIG. 6 shows a graph 600 of how the algorithm proceeds for the space of groups shown in FIG. 3 (using the MAXPART benefit function). The numbers beside each group indicate whether or not the group satisfies the given aggregate constraint. The partition defined by column GroupID1 in Scenario 3 is returned as the optimal partition. The frontier corresponding to this partition is illustrated as a dotted line that circumscribes the first component 304 and the second component 306.

How the initial partition for the disclosed constraint satisfaction algorithm is picked will now be described. First, since considering a specific form of splitting, even though two previously proposed algorithms can be expressed as partitions consisting of valid groups, not all previously proposed deduplication algorithms can. Other previously proposed algorithms can be accommodated simply by initializing the tree with the algorithm output. Previously described algorithms provide a knob such as a similarity threshold which can be used to collapse a few tuples with each other or be aggressive and collapse many tuples into one bucket. The latter is selected by proceeding with a coarse initial partition, and therefore, setting the knob appropriately so that many tuples are collapsed together.

Various extensions to the disclosed constraint satisfaction framework are now described. While the description heretofore has been carried out for the class of aggregate constraints, the disclosed techniques can be more general. As defined above these are conditional on the class of constraints described herein, but can easily be generalized to a groupwise constraint that takes a group as input and returns true or false. For example, positive and negative example constraints can be employed. A positive example constraint consists of an equivalence class of tuples denoting a positive example. A group satisfies the constraint if the group contains all or none of the tuples in the equivalence class.

A negative example constraint also consists of an equivalence class of tuples, which denotes a negative example. A group satisfies the constraint if the group contains at most one of the tuples in the equivalence class. Note that the difference from conventional work in constrained clustering is that these examples can be groupwise, and not necessarily pairwise. For instance, a constraint can be provided that asserts that the names "Alice Jones", "A. Jones" and "Jones" which refer to the same person or that the names "John Doe", "J. Doe" and "John D." refer to different persons. Another example of groupwise constraints involves deduplicating the authors relation in a publication database. Here it can be desired to assert conditions such as: for any group, the gap between the minimum year of publication and the maximum year of publication must not be more than 40, thus capturing the intuition that most author publishing careers span less than 40 years. The fact that it is desirable to maximize the number of groups that satisfy the constraint means enforcement is not necessarily a hard constraint. The disclosed techniques generalize to cover these and other such constraints.

An extension can be made to set-based constraints. When deduplicating the Authors relation in Example 4, it may be desired to exploit a set-based constraint that requires that for any group, the set JACM papers according to both the databases be the same (or almost the same), instead of relying on the counts. This can be easily extended to ensure that no two co-authors are ever collapsed into the same group.

As another example, of how to choose a suitable benefit function as a generalized technique, since the disclosed algorithm finds the optimal partition, the description can be in terms of a cost function sought to be minimized. In other words, as long as the cost of a partition is obtained by adding up the cost associated with an individual group, the algorithm continues to be optimal. For example, modify a group that satisfies a constraint by renaming the values to the same target, a centroid (e.g., along the lines of the traditional k-means approach). This can be used to define the cost of a group as the cost of transforming each tuple to the centroid. If a group does not satisfy the constraint, the cost of the group can be set to be a large number. Consider that the input relation R is such that a repair exists for the given aggregate constraint. Now, minimizing the cost function corresponds to finding a minimal repair of the given database such that the constraint is satisfied by every group.

The specific Split function 500 of FIG. 5 generalizes two previous techniques for deduplication: single-linkage and compact sets. However, the algorithm 500 listed in FIG. 5 is applicable even if a different methodology of splitting a group is chosen. For example, a group can be split by computing the minimum cut of the similarity graph. This would also yield a search space where the algorithm 500 of FIG. 5 finds the optimal partition.

The approach adopted herein is that of restricting the search space of valid groups and seeking a partition consisting of valid groups from this space. A specific chosen search space is obtained by beginning with an initial partition of the data and splitting the groups by raising the similarity threshold. As described supra, the choice of search space is a first step in incorporating constraints into deduplication.

The intractability analysis above illustrates that there are two sources of hardness in the overall problem of deduplication with constraints. One is that the number of valid groups is itself large making it difficult to even check whether there is a single group that satisfies the constraint. Second, picking a partition from among the space of valid groups is difficult. The disclosed approach is to fix the first source of hardness above by restricting the search space.

Consider a variation of this approach where the space of valid groups is provided explicitly as part of the input, so that the complexity does not arise from a large space of valid groups and where a goal is restricted to finding a partitioning from among these groups. Given a relation R and a set of valid groups, it can be assumed that this set of valid groups contains singletons corresponding to the tuples in R. Associated with each group is a benefit. A goal is to find a partition of R consisting of valid groups that maximizes the value of the benefit function.

It can be observed that deduplication problem is closely related to a classic Weighted Set Packing (WSP) problem. In WSP, a collection of sets is drawn from a base universe each with an associated benefit and the goal is to identify a collection of disjoint sets from the input collection that has the maximum total benefit, obtained by adding the individual benefits.

Notice that the output of WSP is not required to be a partition of R. This is what distinguishes the WSP problem from the disclosed situation. Given that the input contains singleton elements from R and given that adding singleton elements can only improve the total benefit of the grouping, it can be assumed without loss of generality that the optimal solution returned by WSP is a partition of R. Thus, algorithms for WSP can be used. Unfortunately, WSP is known to be NP-hard. However, it has been shown in the art that the problem is approximable within factor $\sqrt{N}$ through a greedy algorithm. It can be shown that this algorithm can be adapted to the disclosed setting. Following is a conventional greedy algorithm that can be employed for approximating a partition in relation R that maximizes the benefit function. Again, the main difference is that a partition of R is guaranteed.

procedure GREEDYDEDUP
1. $t \leftarrow 0$, $C_t \leftarrow$ the set of valid groups
2. repeat
3.      $t \leftarrow t + 1$
4.      $X_t \leftarrow C \in C_{t-1}$ that maximizes benefit$(C)/\sqrt{|C|}$
5.      Remove all sets that intersect $X_t$
         from $C_{t-1}$ to obtain $C_t$
6. until $C_t$ is empty
7. return $\{X_1,...,X_t\}$ Based on analysis, the following result can be shown.

THEOREM 1. Algorithm GREEDYDEDUP yields an approximation of $\sqrt{N}$, where N is the cardinality of R.

It can now be shown that it is likely to be computationally hard to do significantly better than GREEDYDEDUP for cases where the number of valid groups is linear in the data size. In the setting of large data sets, it is reasonable to assume that the number of valid groups is at most linear in the data size.

THEOREM 2. Consider the special case of MAXTUP where the number of valid groups is linear in the data size. For each $\epsilon > 0$, it is NP-hard in the data size to approximate this problem within factor $N^{1/4-\epsilon}$ (N is the cardinality of R).

Figure 7:
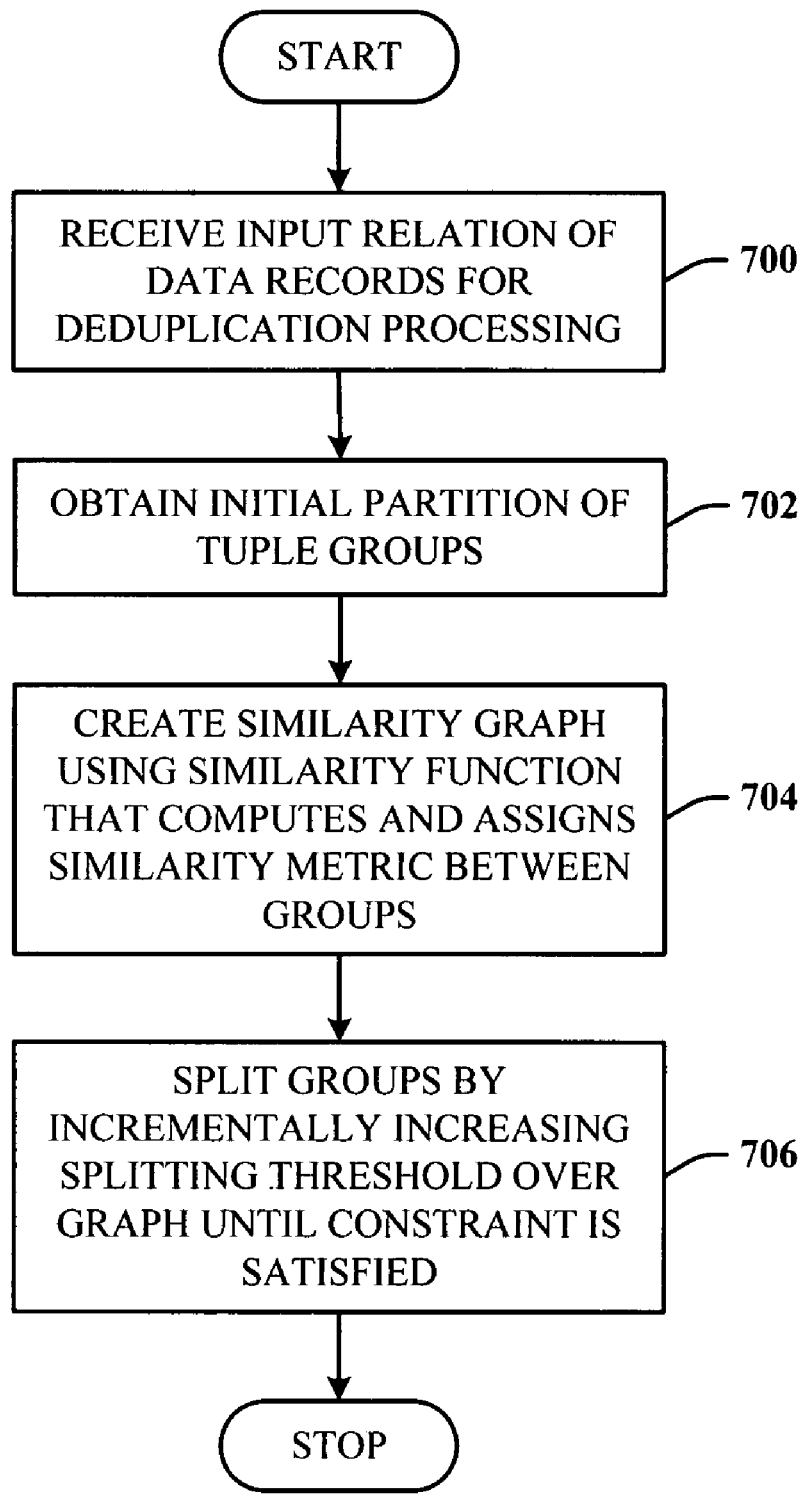
FIG. 7 illustrates a method of deduplicating data.

FIG. 7 illustrates a method of deduplicating data. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 700, an input relation of data records is received for deduplication processing. At 702, an initial partition of tuple groups is obtained. At 704, a similarity graph is created using a similarity function that computes and assigns similarity metrics between the groups. At 706, the groups are split by incrementally increasing a similarity (or splitting) threshold over the graph until the constraint is satisfied.

Figure 8:
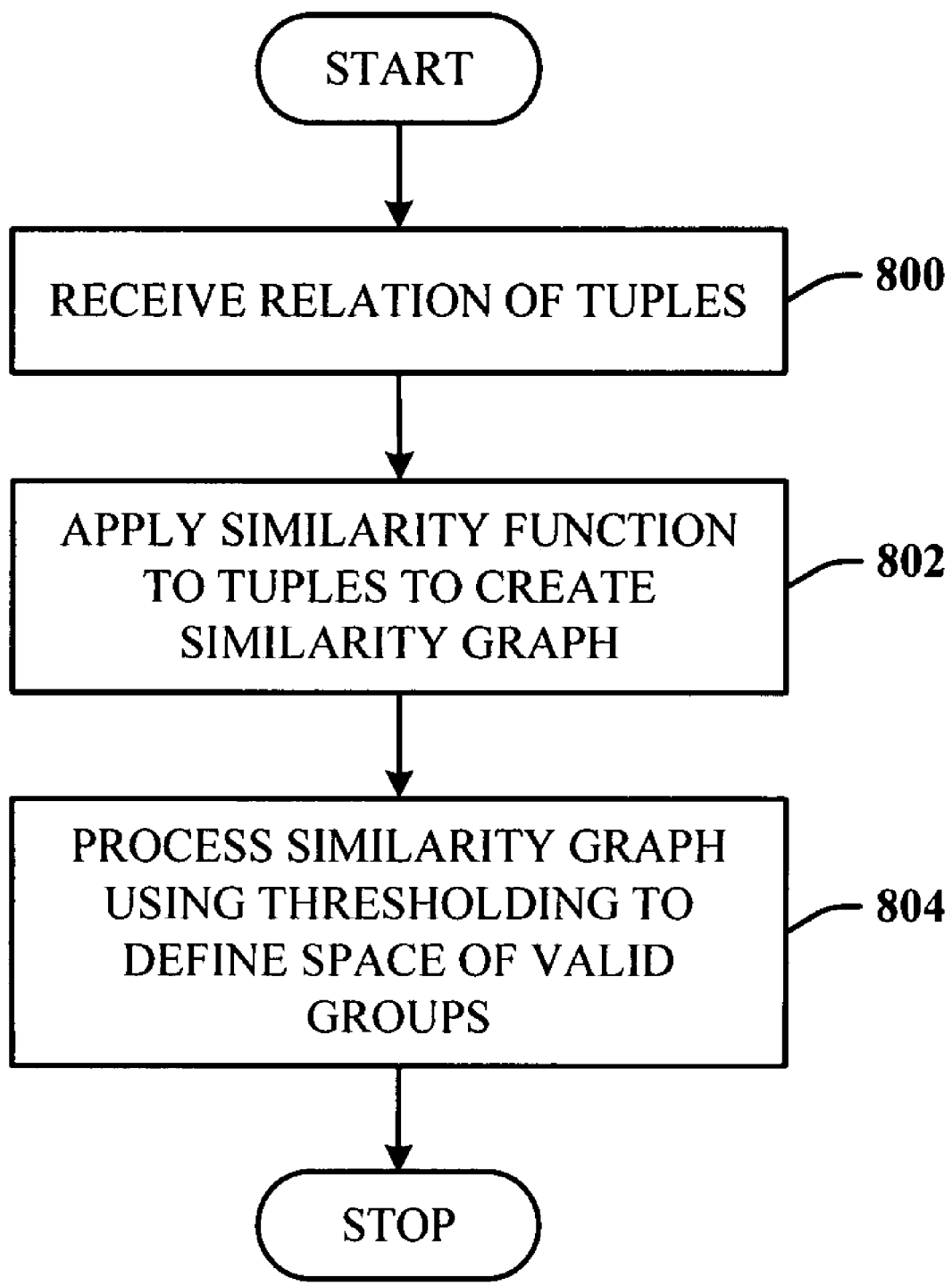
FIG. 8 illustrates a method of generating a space of valid groups.

FIG. 8 illustrates a method of generating a space of valid groups. At 800, a relation of tuples is received. At 802, a similarity function is applied to tuples to create a similarity graph. At 804, process similarity graph using thresholding to define the space of valid groups.

Figure 9:
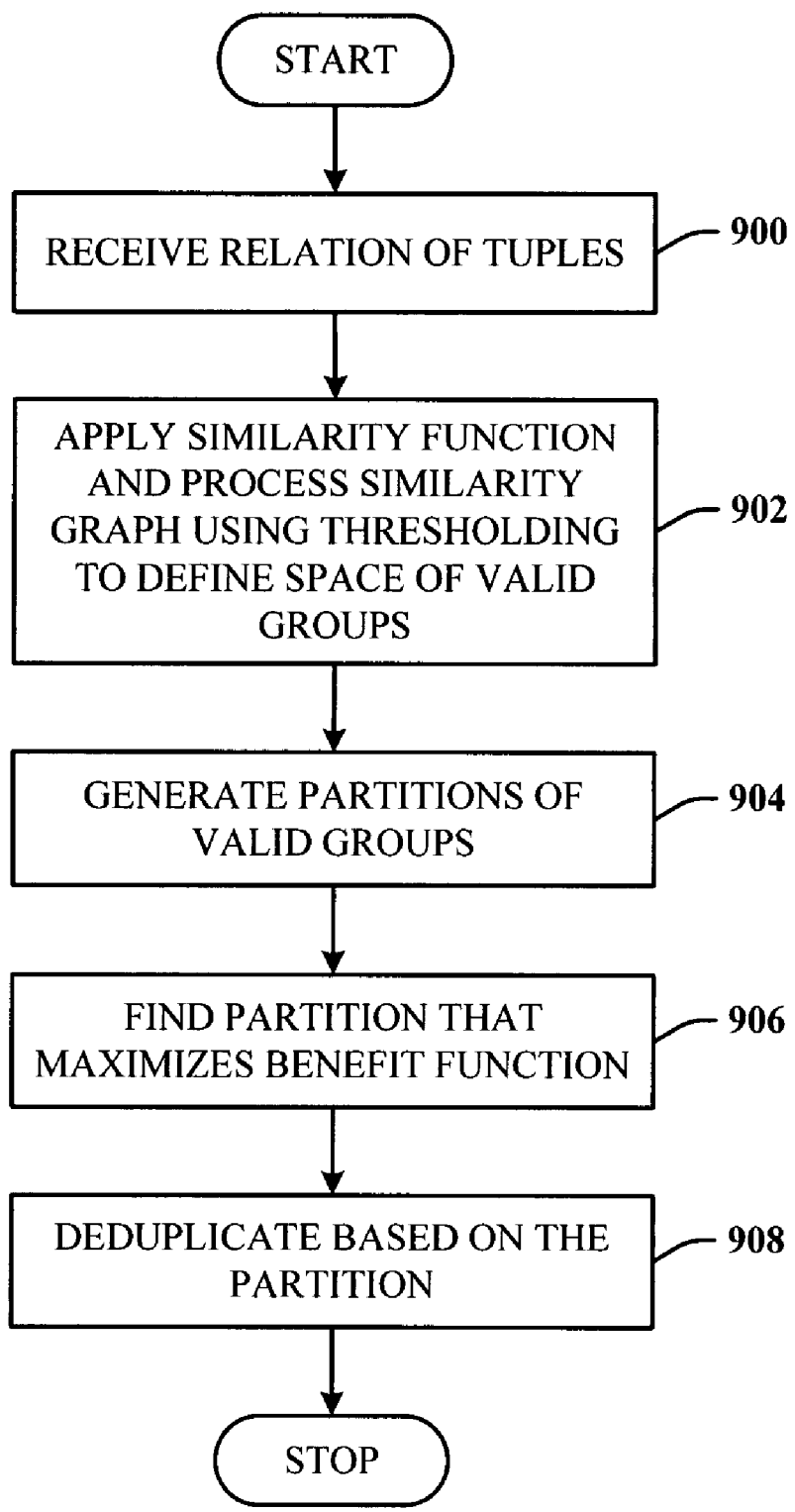
FIG. 9 illustrates a method of finding valid groups that maximize a benefit function.

FIG. 9 illustrates a method of finding valid groups that maximize a benefit function. At 900, a relation of tuples is received. At 902, a similarity function is applied to generate a similarity graph, and the graph is processed using thresholding to define a space of valid groups. At 904, partitions of the groups are generated. At 906, the partition that maximizes a benefit function is found. At 908, deduplication is performed based on the partition.

Figure 10:
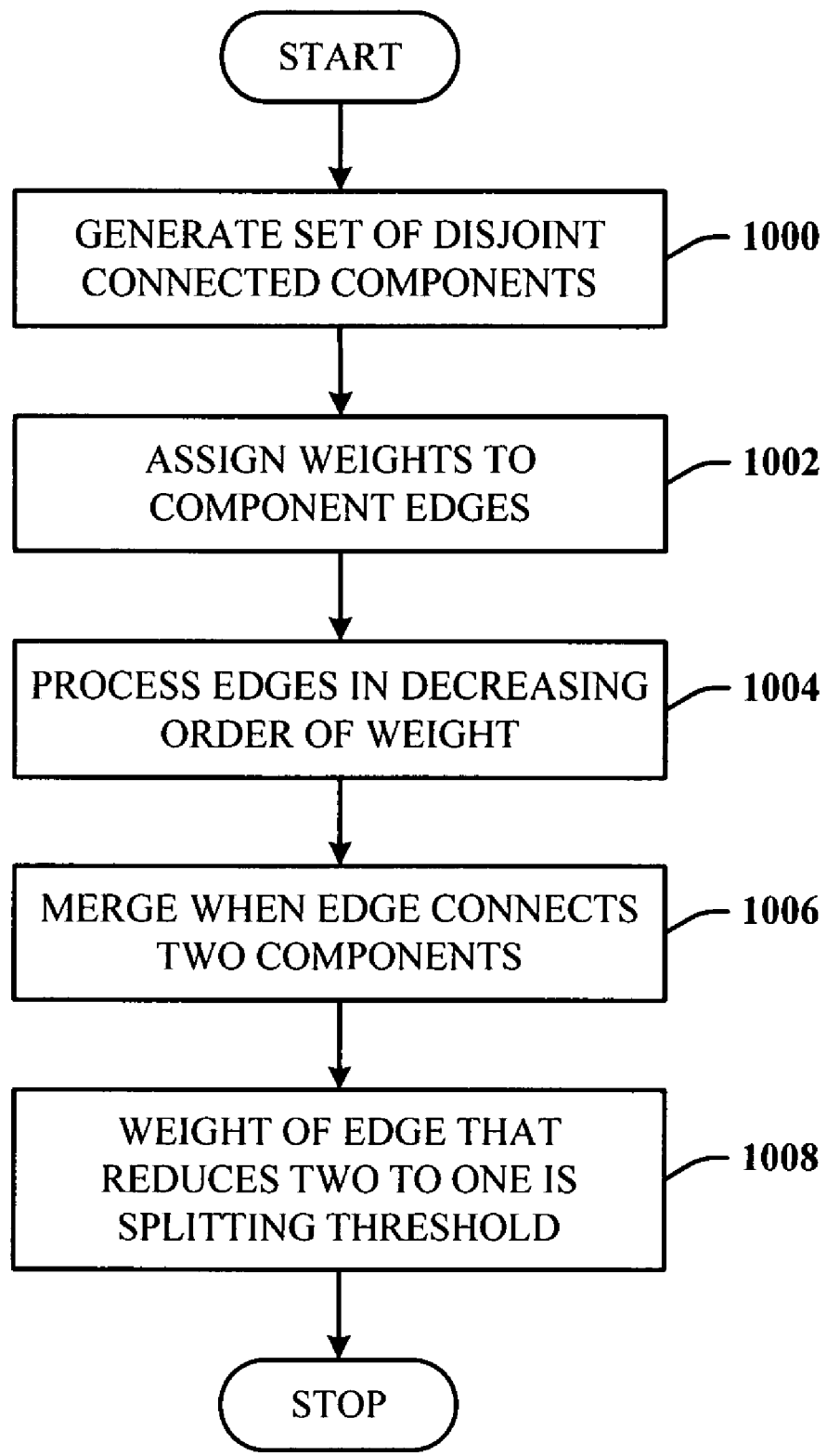
FIG. 10 illustrates a method of determining a splitting threshold.

FIG. 10 illustrates a method of determining a splitting threshold. At 1000, a set of disjoint connected components is generated. At 1002, weights are assigned to the component edges. At 1004, the edges of the components are processed in decreasing order of the weights. At 1006, components are merged when an edge connects the components. At 1008, the weight of the edge that reduces the two components to one is used as the splitting threshold.

The disclosed systems and methods address the problem of incorporating groupwise aggregate constraints into the problem of deduplication. The formulation is developed by first considering how to proceed without exploiting the textual similarity between tuples. It is shown that this approach is intractable (unless NP=P). Based on this analysis, a maximum constraint satisfaction problem is formulated textual similarity leveraged to restrict the search space of partitions. An algorithm that optimally solves the constraint maximization problem over this search space is disclosed. The framework is extensible for applicability not only for the aggregate constraints, but for a larger class of groupwise constraints.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
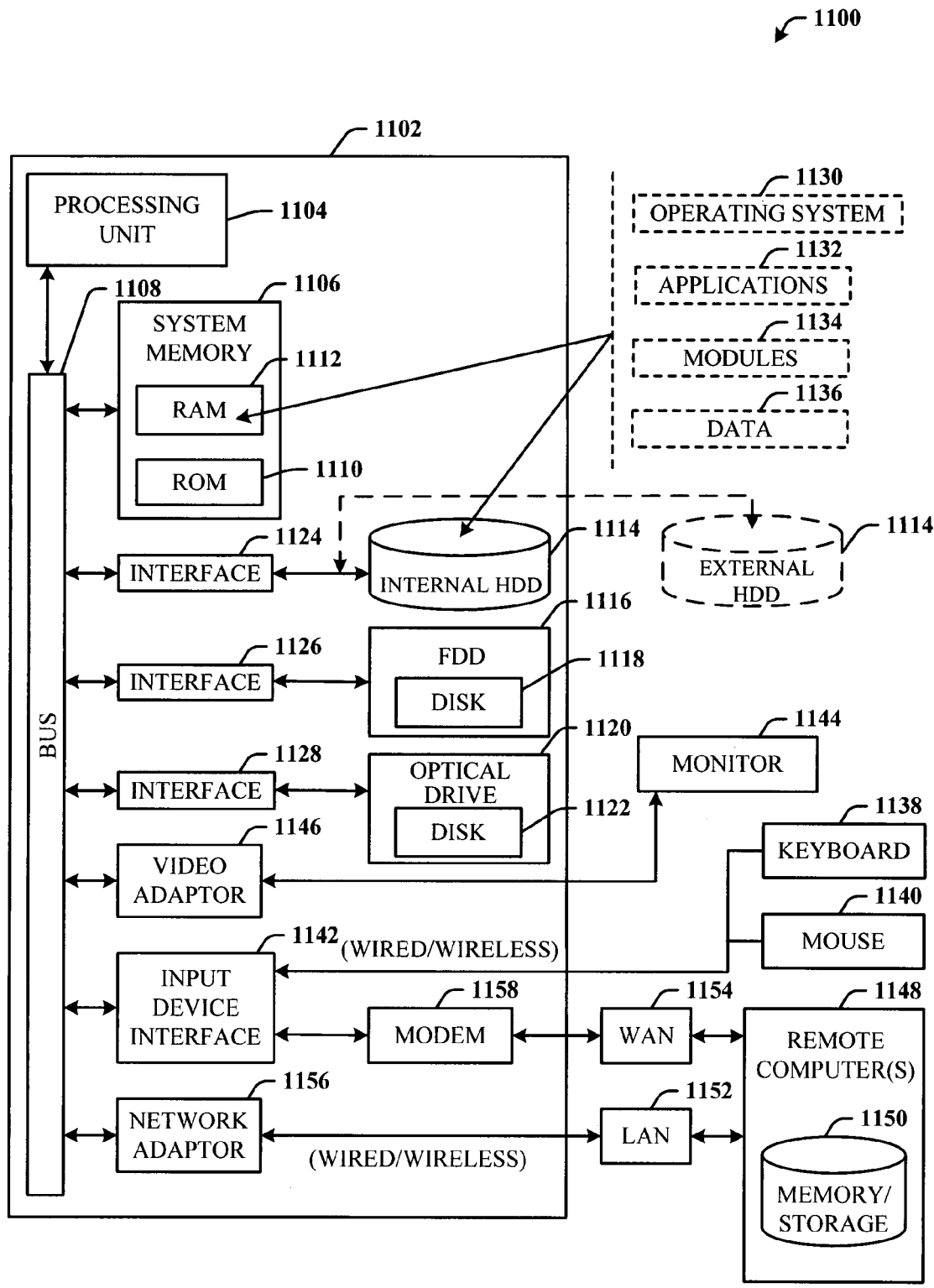
FIG. 11 illustrates a block diagram of a computing system operable to execute the disclosed deduplication algorithms.

Referring now to FIG. 11, there is illustrated a block diagram of a computing system 1100 operable to execute the disclosed deduplication algorithms. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102, the computer 1102 including a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1112, including an operating system 1130, one or more application programs 1132, other program modules 1 34 and program data 1136. The one or more application programs 1132, other program modules 1134 and program data 1136 can include the constraint component 102 and deduplication component 106 of FIG. 1, the similarity component 202, constraint maximization component 206 and cost function 208 of FIG. 2, for example.

All or portions of the operating system, applications, modules, and/or data can also be cached in the RAM 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the local network 1152 through a wire and/or wireless communication network interface or adapter 1156. The adaptor 1156 may facilitate wire or wireless communication to the LAN 1152, which may also include a wireless access point disposed thereon for communicating with the wireless adaptor 1156. 1001171 When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 12:
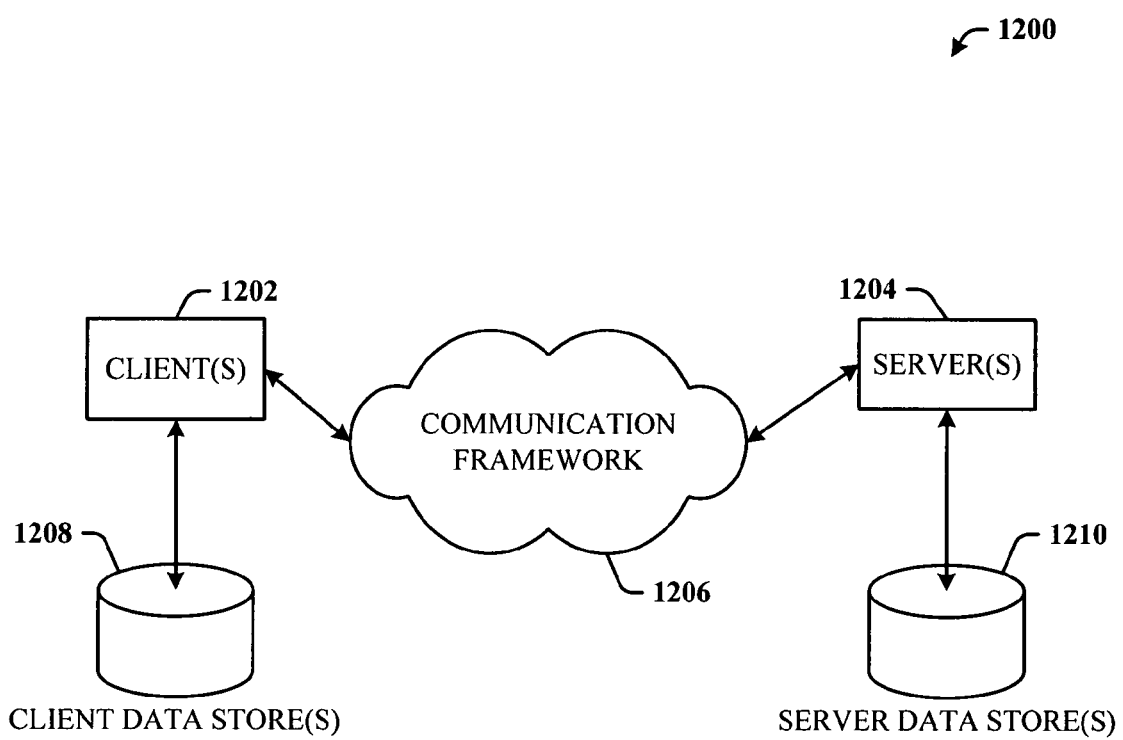
FIG. 12 illustrates a schematic block diagram of an exemplary computing environment for data deduplication.

Referring now to FIG. 12, there is illustrated a schematic block diagram of an exemplary computing environment 1200 for data deduplication. The system 1200 includes one or more client(s) 1202. The client(s) 1202 can be hardware and/or software (e.g., threads, processes, computing devices). The client(s) 1202 can house cookie(s) and/or associated contextual information, for example.

The system 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204. The servers 1204 can include data records the needs to be deduplicated in accordance with the disclosed methods and systems. This can also include data stored locally on the client data stores 1208.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for data deduplication, the computer-implemented system comprising:
    a constraint component configured to provide aggregate constraints for collapsing potentially duplicate data records, wherein the aggregate constraints are based on functions that aggregate values over multiple data records;
    a similarity component configured to measure similarity of the potentially duplicate data records using a similarity function and to split the potentially duplicate data records into groups based on the similarity function;
    a deduplication component configured to apply a benefit function to the groups to identify a partition of the potentially duplicate data records, wherein the benefit function reflects satisfaction of the aggregate constraints by the groups of potentially duplicate data records; and
    a processing unit configured to execute one or more of the constraint component, the similarity component, or the deduplication component.

2. The system of claim 1, wherein an individual aggregate constraint is based on a structured query language (SQL) aggregate function.

3. The system of claim 2, wherein the SQL aggregate function employs a comparison operator that is one of less than, less than or equal to, equal, greater than, or greater than or equal to.

4. The system of claim 1, wherein the similarity function provides a measure of textual similarity between pairs of the potentially duplicate data records.

5. The system of claim 4, further comprising a constraint maximization component configured to maximize satisfaction of an individual aggregate constraint according to the benefit function.

6. The system of claim 5, wherein the constraint maximization component is configured to maximize a number of groups of the partition that satisfy the individual aggregate constraint.

7. The system of claim 5, wherein the constraint maximization component is configured to maximize a number of the potentially duplicate data records that are members of groups that satisfy the individual constraint.

8. The system of claim 1, wherein the groups are constructed by incrementally thresholding a similarity graph.

9. The system of claim 1, further comprising a cost function configured to determine a cost associated with finding an optimal partition.

10. A computer-implemented method of deduplicating data, the computer-implemented method comprising:
    receiving an input relation of data records for deduplication processing to collapse duplicate data records, the input relation having an aggregate constraint based on a function that aggregates values over the data records;
    obtaining an initial partition of groups of the data records;
    creating a similarity graph using a similarity function that computes and assigns similarity metrics between the data records;
    splitting the groups by incrementally raising a splitting threshold over the similarity graph and adding some of the split groups to a set of valid groups; and
    applying a constraint satisfaction formulation to the set of valid groups to identify a partition that collapses at least some of the duplicate data records.

11. The method of claim 10, wherein applying the constraint satisfaction formulation comprises generating the partition, wherein the partition maximizes a benefit function.

12. The method of claim 10, wherein the aggregate constraint comprises a SQL aggregate constraint.

13. The method of claim 10, wherein the similarity function quantifies textual similarity between individual data records.

14. The method of claim 10, further comprising collapsing the groups based on the partition.

15. The method of claim 10, wherein applying the constraint satisfaction formulation further comprises considering additional constraints to identify the partition.

16. One or more computer-readable memory devices or computer-readable storage devices comprising computer-executable instructions which, when executed by a processing unit, cause the processing unit to perform acts comprising:

- providing aggregate constraints for collapsing tuples, wherein the aggregate constraints are based on functions that aggregate values over the tuples;
- measuring similarity of the tuples by applying a similarity function to the tuples;
- splitting the tuples into groups of the tuples based on the measured similarity; and
- applying a benefit function to the groups of the tuples to identify a partition of the tuples, wherein the benefit function reflects satisfaction of the aggregate constraints by the partition.

17. The one or more computer-readable memory devices or computer-readable storage devices according to claim 16, wherein the benefit function reflects a number of groups of the partition that satisfy the aggregate constraints.

18. The one or more computer-readable memory devices or computer-readable storage devices according to claim 16, wherein the benefit function reflects a number of tuples of the partition that satisfy the aggregate constraints.

19. The one or more computer-readable memory devices or computer-readable storage devices according to claim 16, wherein the similarity function is applied to pairs of the tuples.

20. The one or more computer-readable memory devices or computer-readable storage devices according to claim 19, wherein the similarity function reflects textual similarity between the pairs of the tuples.

* * * * *